US005467117A

United States Patent [19]

Evans et al.

[11] Patent Number: 5,467,117

[45] Date of Patent: Nov. 14, 1995

[54] ADDITION OF ALCOHOL TO PREWET SOLUTIONS TO ENHANCE AND ACCELERATE WETTING TO HYDROPHOBIC FOAMS FOR APPLICATION TO INK-JET PENS

[75] Inventors: Roger F. Evans; Charles L. Thierheimer, Jr.; Norman E. Pawlowski, all of Corvallis, Oreg.

[73] Assignee: Hewlett-Packard Company, Palo Alto, Calif.

[21] Appl. No.: 200,794

[22] Filed: Feb. 23, 1994

[51] Int. Cl.$^6$ .................... G01D 15/18

[52] U.S. Cl. .................... 347/87; 347/85; 347/86

[58] Field of Search .................... 347/85, 86, 87

[56] References Cited

U.S. PATENT DOCUMENTS 4,771,295 9/1988 Baker et al. .................... 346/1.1
4,885,932 12/1989 Heffernan et al. .................... 73/83
5,319,841 6/1994 Yata et al. .................... 29/451

*Primary Examiner*—Benjamin R. Fuller
*Assistant Examiner*—Valerie Ann Lund

[57] ABSTRACT

A method is provided for enhancing and accelerating wetting of hydrophobic foams for use as ink reservoirs in ink-jet printer pens. First, the foam is placed in a prewet bath, having already been compressed to expel air. The prewet bath contains an aqueous solution with a low molecular weight alcohol additive, such as n-propanol, ranging in concentration from about 3 to 10 wt. %. Second, the foam is repeatedly compressed and allowed to expand while in the prewet bath, thereby promoting the foam's absorbance of prewetting solution and further improving foam wettability. Finally, the foam is removed from the prewet bath and is compressed to expel excess prewetting solution. The foam retains residual alcohol from the prewet bath that subsequently becomes a constituent of the ink stored in the foam. In addition to improving the wetting process for hydrophobic foam, the alcohol additive prevents orifice plugging within ink-jet pens by becoming a residual constituent of the ink and wetting pen parts through ink usage.

19 Claims, 3 Drawing Sheets

ADDITION OF ALCOHOL TO PREWET SOLUTIONS TO ENHANCE AND ACCELERATE WETTING TO HYDROPHOBIC FOAMS FOR APPLICATION TO INK-JET PENS

TECHNICAL FIELD

The present invention relates to foam used as ink reservoirs in ink-jet printer pens. Specifically, the present application relates to a method whereby hydrophobic foam is treated with alcohol in an aqueous solution to reduce the surface tension of the foam in preparation to receive and retain ink.

BACKGROUND ART

Ink-jet printers employ ink reservoirs to supply printheads with ink. An ink reservoir can consist of foam housed within a pen cartridge, the foam having been permeated with ink. The foam absorbs and retains the ink, thereby enabling a printer to control the rate at which ink flows to the printhead.

The process of ink-jet printing requires that a continual supply of ink be available to the printhead. In thermal ink-jet printers, the printhead comprises a plurality of tiny nozzles in a nozzle plate. Underneath each nozzle is a firing chamber which is commonly fed with ink from a plenum connected to the ink reservoir. A microprocessor in the printer emits a signal that directs the expulsion of ink through a nozzle so that the ink forms a droplet. The trajectory of the droplet is such that the droplet strikes the paper at a precise target. The precision required in ink-jet printing makes the ink reservoir's ability to efficiently, reliably, and predictably supply ink to the printhead nozzles critical.

Therefore, the foam comprising an ink reservoir must effectively retain ink to prevent unintentional seepage of the ink out of the cartridge. Additionally, the foam must supply ink as required by the printhead. Lastly, the foam must accomplish these goals without adversely affecting the quality of the ink.

As manufactured, most organic polymer-based foam is unable to meet these goals. Untreated polyurethane foam is hydrophobic and therefore does not readily absorb an aqueous-based ink. One method used to prepare foam to serve as an ink reservoir involves prewetting the foam prior to loading it with ink. Prewetting the foam reduces its hydrophobicity so that the foam absorbs rather than repels the ink.

The process commonly used to prewet foam involves compressing the foam to expel air from the foam and immersing the compressed foam in a fluid. The foam then absorbs the surrounding fluid as it expands toward its uncompressed state. The foam is repeatedly compressed and allowed to expand while it remains immersed in order to enhance and accelerate wetting. Once the foam is completely wet, it is removed from the fluid and compressed to expel excess fluid. The treated foam is then stuffed into a tube which is placed within the pen body. The tube is removed, leaving the treated foam to serve as an ink reservoir. Ink is then injected into the treated ink reservoir.

Various fluids have been used to prewet foam in commercial applications. Three fluids that commonly serve as prewet solutions are water, ink, and ink "vehicle". (Ink vehicle is the fluid that carries the dye in ink compositions. It is commonly composed of a low vapor pressure solvent miscible with water, such as a glycol, specifically, diethylene glycol.) However, each of these three fluids manifests serious drawbacks and shortcomings as prewetting solutions.

The use of ink as a prewetting solution for foam poses several problems. First, the color of the ink used to prewet the foam must be matched to the color of the ink subsequently injected into the foam. This inability to use the same color ink for each prewetting process increases assembly time and effort by requiring separate accommodations and handling for different ink colors. Second, ink is expensive compared to other fluids available for prewetting foam such as water and ink vehicle. Therefore, while ink is effective as a prewetting solution, its use is both inconvenient and costly.

The use of ink vehicle as a prewetting solution also poses certain drawbacks. When used as a prewetting solution, ink vehicle adversely affects print quality by diluting the ink subsequently stored within the prewetted foam. Therefore, while ink vehicle offers a colorless, cheaper alternative to ink as a prewetting solution, the resulting reduction in print quality is unacceptable.

Finally, the use of water as a prewetting solution is also problematic. Like ink vehicle, water provides a colorless, cheaper alternative to ink. However, water is not as effective as either ink or ink vehicle in prewetting foam. The level of wetting achieved by using water is inferior to that obtained by using either ink or ink vehicle. Furthermore, using water to prewet foam is more time-consuming than using ink or ink vehicle. The foam must be exposed to water for longer periods of time than required when using ink or ink vehicle to achieve even an adequate level of wetting.

Thus, a need remains for a method of prewetting hydrophobic foam that will render the foam able to efficiently and uniformly absorb ink while minimizing the time, effort, and expense associated with the prewetting process. This need must be achieved without sacrificing print quality.

DISCLOSURE OF INVENTION

In accordance with the invention, an improved method is provided for prewetting hydrophobic foam for application to ink-jet printers. The method utilizes an aqueous prewetting solution with a concentration of low molecular weight alcohol ranging from about 3 to 10 wt. %. Examples of low molecular weight alcohols employed in the practice of the present invention include methanol, ethanol, n-propanol, iso-propanol, 2-propenol (allyl alcohol), and 2-propynol (propargyl alcohol). Optionally, the aqueous solution may also contain a biocide at a concentration ranging from about 0.1 to 0.5 wt. %.

The improved prewetting method comprises the following steps:

(a) compressing the hydrophobic foam to expel air from the foam;

(b) placing the compressed foam in a prewet bath containing the low molecular weight alcohol solution;

(c) allowing the compressed foam to expand in the prewet bath as it absorbs the prewetting solution;

(d) compressing the foam while it is in contact with the prewetting solution;

(e) repeating steps (c) and (d) from one to three times to enhance the foam's absorbance of the prewetting solution;

(f) removing the foam from the prewet bath; and (g) compressing the foam to expel excess solution.

A residual amount of alcohol remains in the foam at the conclusion of the prewet process, subsequently becoming a constituent of the ink held in the reservoir.

The method of the present invention affords several advantages over prior practices. The present invention exhibits the best features of ink, ink vehicle, and water prewetting processes while avoiding the drawbacks of these processes.

First, the prewetting process of the present invention provides superior wetting results to that achieved by the prior practice of using water without an alcohol additive. The alcohol additive elevates the wettability of the foam to the level achieved by either ink or ink vehicle. Furthermore, the alcohol additive accelerates the wetting process so that the enhanced wettability is achieved at a rate comparable to ink and ink vehicle prewetting methods.

The present invention offers these features while avoiding problems associated with ink and ink vehicle prewetting. The alcohol solution used in the present invention is colorless, thereby avoiding the problems of color matching associated with ink prewetting solutions. Furthermore, the alcohol solution is less costly than ink. Finally, the alcohol solution used in the present invention does not adversely affect print quality and is thus superior to ink vehicle as a prewetting solution.

Second, the present invention offers the added benefit of preventing the formation of orifice plugs in the printhead. A residual amount of alcohol remaining in the foam following the prewetting process subsequently becomes a constituent of the ink. As the ink flows through the printhead, the residual alcohol continuously wets the pen parts and therefore acts to prevent plugging.

Finally, the present invention lubricates the foam so that the foam is more easily installed inside the pen body. Thus, the present invention improves the assembly process.

BEST MODES FOR CARRYING OUT THE INVENTION

Figure 1:
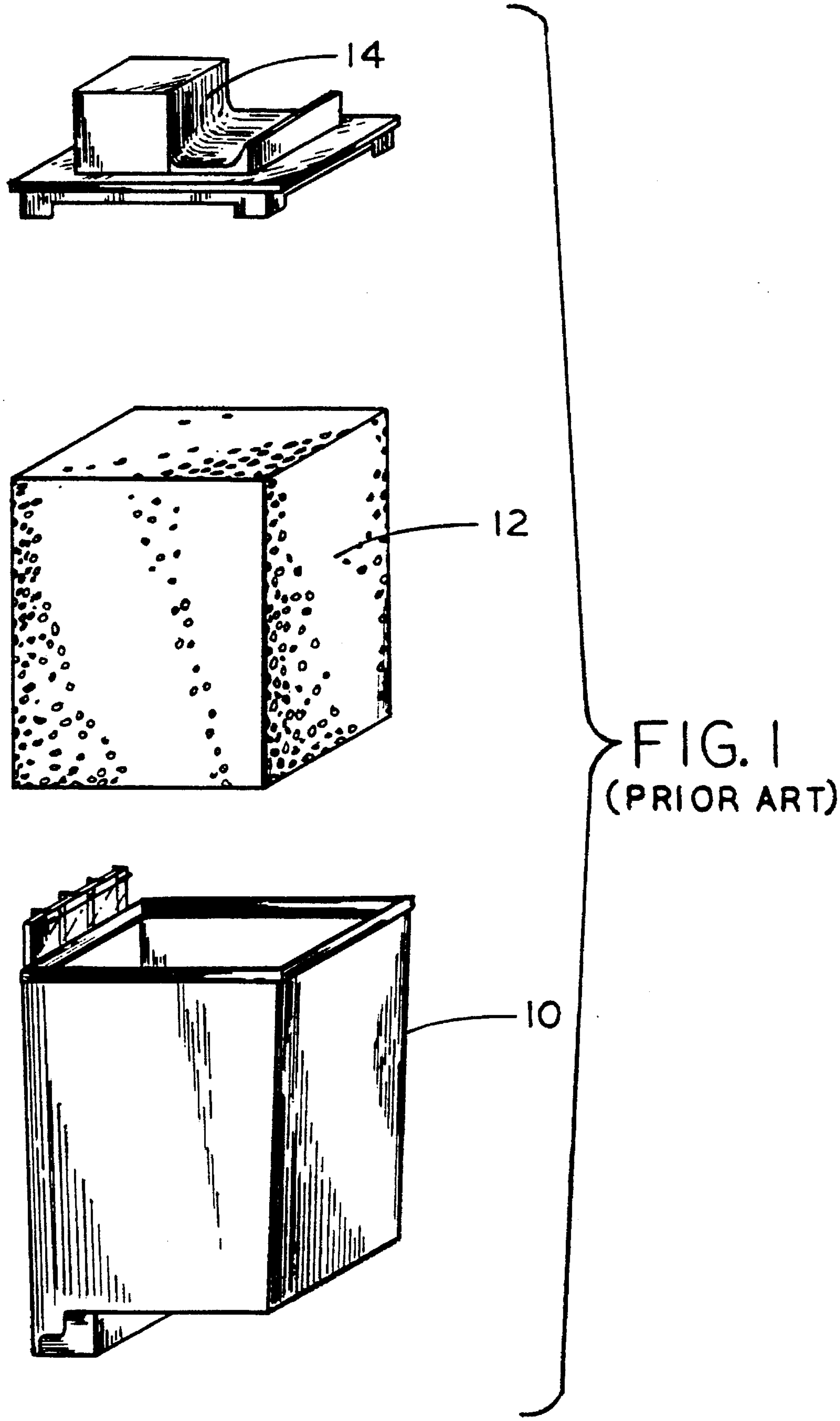
FIG. 1 (PRIOR ART)
FIG. 1 is an exploded view, in perspective, depicting the components of the pen body before assembly.
Figure 2A:
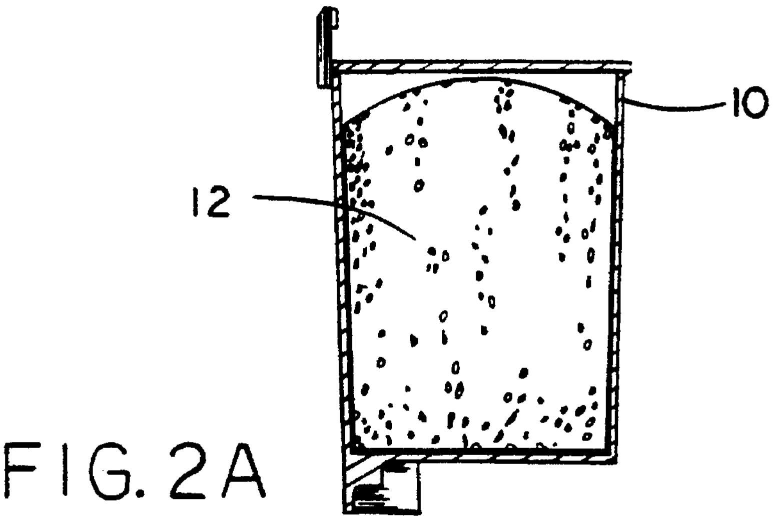
FIG. 2A is a cross-sectional view depicting the assembled foam in the pen body.
Figure 2B:
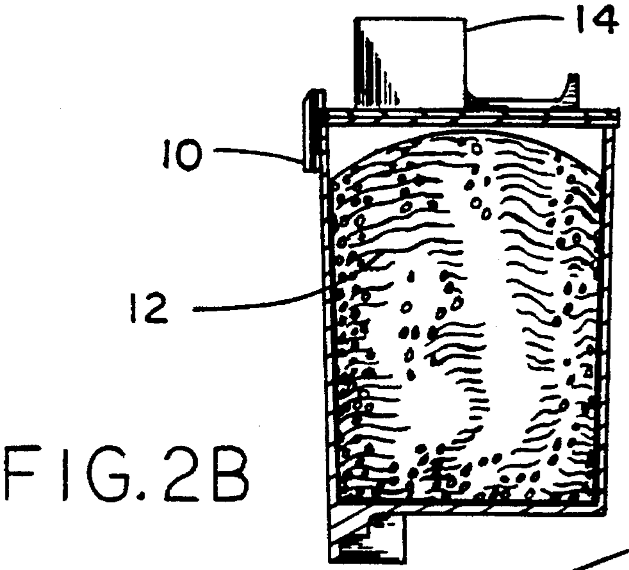
FIG. 2B is a cross-sectional view depicting the foam after injection with ink.
Figure 2C:
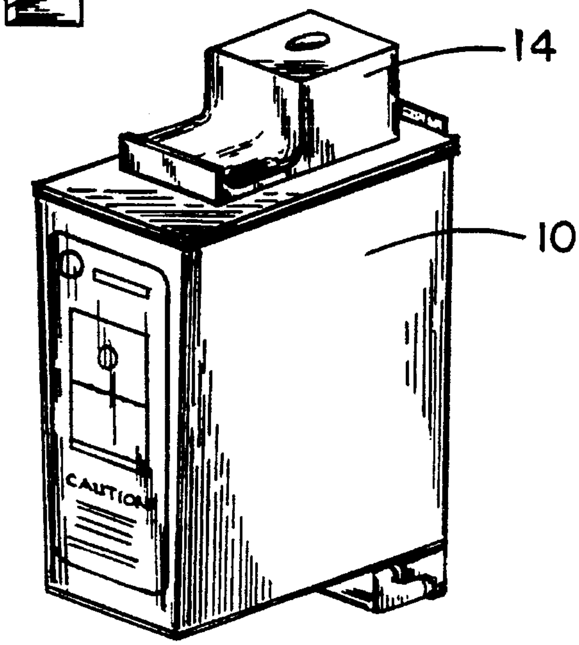
FIG. 2C is a perspective view of the pen body after assembly.
Figure 3:
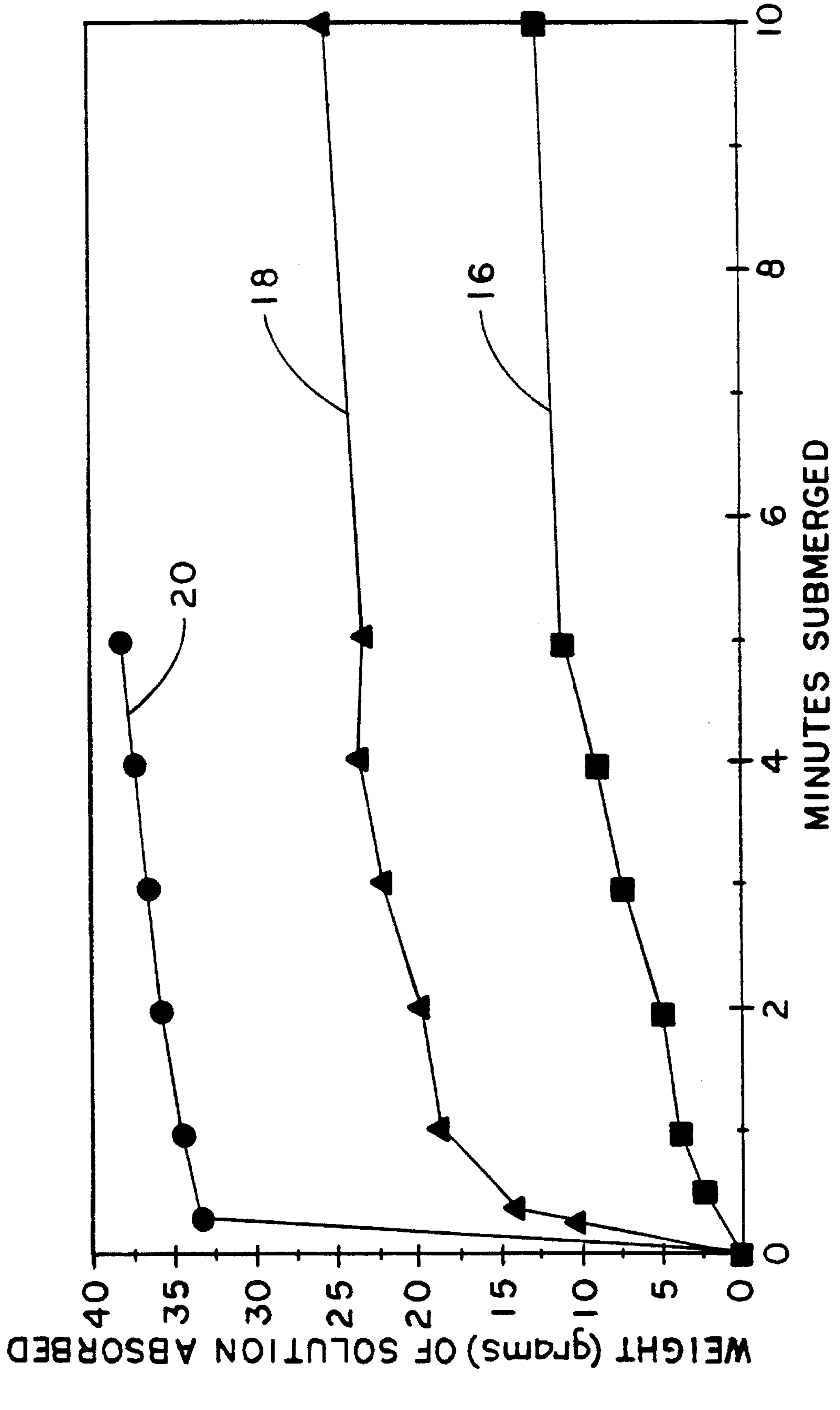
FIG. 3, on coordinates of weight of solution absorbed (in grams) and time submerged (in minutes), is a plot of the wettability curve achieved by the present invention.

Turning now to the Figures, wherein like numerals depict like elements throughout, FIG. 1 shows a single pen body 10, hydrophobic foam 12, and a plug 14. These three elements are assembled in FIGS. 2A–C, which illustrates the foam 12 serving as an ink reservoir after having being compressed and inserted into the pen body 10 (FIG. 2A), and injected with ink (FIG. 2B). FIG. 2C depicts the completed assembly. FIG. 3 illustrates the wettability of the hydrophobic foam achieved by using the present invention in comparison to the prior practice of using water without an alcohol additive. More specifically, FIG. 3 contains the following three curves: Curve 16, representing the wettability of foam 12 achieved with water alone, and Curves 18 and 20, depicting the wettability of foam 12 achieved by using water with iso-propanol at concentrations of 5 and 10 wt. %, respectively. A biocide (0.3 wt. % Proxel GXL) was included in each of the prewet solutions. The results depicted in FIG. 3 were obtained at room temperature.

The present invention involves treating the hydrophobic foam 12 prior to insertion into the pen body 10 in preparation for use as an ink reservoir. The hydrophobic foam 12 is treated with an aqueous solution containing a low molecular weight alcohol additive to reduce the surface tension of the foam prior to receiving ink for storage.

The first step in carrying out the invention involves compressing foam 12 to expel air before exposing the foam to the prewet solution. Removing the air from the foam 12 allows the prewetting solution access to the fine surfaces of the foam, thereby enhancing the wettability of the foam. Compression of the foam 12 as it is performed throughout the prewetting procedure may be accomplished by any suitable mechanical means, such as rollers or plates (not shown). In the preferred embodiment, the foam 12 is compressed to about approximately one-fifth of its free static volume while immersed in the prewet fluid.

Preferably, the foam 12 is completely immersed in the bath in order to maximize exposure of the foam to the prewetting solution. The prewet bath is contained in a closed container, but not sealed, and with exhaust ventilation at room temperature.

The prewetting solution comprises at least one low molecular weight alcohol and water. The low molecular weight alcohol is an alcohol having from one to three carbon atoms. Preferably, the low molecular weight alcohol is one in which the hydroxyl group is attached to a simple alkyl group (rather than an alkenyl or alkynyl group), resulting in methanol, ethanol, n-propanol, iso-propanol, allyl alcohol (1-propene-3-ol), or propargyl alcohol (2-propyn-1-ol). More preferably, the alcohol consists essentially of either n-propanol or iso-propanol, with n-propanol being the most preferred based upon incrementally improved print quality. The purity of the components making up the prewetting solution is that found in normal commercial practice.

The concentration of the low molecular weight alcohol ranges from 3 to 10 wt. % of the aqueous solution. At least about 3 wt. % alcohol is required to realize the benefits of the present invention. Increasing the concentration beyond 10 wt. % causes a corresponding decrease in print quality by changing the wetting characteristics of the ink in relation to the paper fiber. A concentration of about 5 wt. % is preferable, since this concentration strikes an optimum balance between the alcohol's ability to increase the wettability of the foam 12 and the alcohol's propensity to adversely affect print quality.

The prewetting solution employed in the present invention may include, in addition to water and an alcohol additive, a biocide to curb the incidence of certain organisms, as is well-known in the art of ink-jet inks. Proxel is an example of a biocide suitably employed in the practice of the present invention. Alternatively, other biocides commonly employed in ink-jet inks may also be employed in the practice of the present invention. If employed, the biocide is present in an amount ranging from about 0.1 to 0.5 wt. %, with the preferred concentration being about 0.3 wt. %.

Once the foam 12 has been placed in the prewet bath, it is allowed to expand toward its uncompressed state as it absorbs prewetting solution. To further enhance and accelerate wetting, the foam, 12 is again compressed as it remains in the prewet bath. The foam 12 is subjected to at least two cycles of expansion followed by compression while in the prewet bath. Preferably, the invention employs three expansion/compression cycles. The compressions are accomplished by exerting mechanical pressure on the narrow axis of the foam 12, indicated by arrows A. In the preferred embodiment, the foam 12 is compressed to approximately one-fifth of its static free volume.

The foam 12 remains in the prewet bath undergoing expansion/compression cycles for a total time ranging from about 5 to 10 seconds, preferably about 7 seconds. Also in the preferred embodiment, the foam 12 is removed from the bath upon completion of the compression/expansion cycles.

Finally, the foam 12 is compressed upon removal from the prewet bath to expel excess solution. In the preferred embodiment, the foam 12 is compressed to less than one-half of its static free volume, or an amount necessary to control the amount of retained fluid, which amount provides a dilution of no more than 10% of the ink by the prewet solution. In the particular example disclosed herein, the desired amount of prewet solution remaining in the foam was 3.5 g.

Upon completion of the steps disclosed by the present invention, the compressed foam 12 is placed inside the pen body 10 and injected with ink, thereby forming an ink reservoir. Specifically, the treated foam is stuffed into a tube (not shown) which is placed within the pen body. The tube is removed, leaving the treated foam to serve as an ink reservoir. Ink is then injected into the treated ink reservoir.

A residual amount of alcohol remaining in the foam 12 from the prewetting procedure becomes a constituent of the injected ink. The concentration of alcohol in the ink varies according to the concentration of the alcohol used to prewet the foam 12. However, in the preferred embodiment wherein the prewetting solution contains 5 wt. % alcohol, the ink subsequently stored in the prewetted foam contains a residual concentration of about 0.5 wt. % alcohol. The residual alcohol in the ink acts to wet pen parts and thereby prevents orifice plugging within the ink-jet pen.

Thus, there has been disclosed a method for enhancing and accelerating wetting to hydrophobic foams for application to ink-jet pens. It will be readily apparent to those of ordinary skill in this art that various changes and modifications of an obvious nature may be made, and all such changes and modifications are considered to fall within the scope of the invention, as defined by the appended claims.

What is claimed is:

1. A method for accelerating and enhancing wetting of hydrophobic foams as ink reservoirs for application to ink-jet pens, comprising the steps of:

(a) compressing said hydrophobic foam to expel air from the foam, thereby forming compressed foam;

(b) placing said compressed foam in a prewet bath containing a solution comprising about 3 to 10 wt. % of a low molecular weight alcohol, 0 to about 0.5 wt. % biocide, and the balance water;

(c) allowing said compressed foam to expand in said prewet bath and to thereby absorb said solution;

(d) compressing said foam while said foam remains in said prewet bath;

(e) repeating steps (c) and (d) at least once;

(f) removing said foam from said prewet bath; and (g) compressing said foam, thereby expelling excess solution while leaving a residual amount of said alcohol within the foam.

2. The method of claim 1 wherein the number of repetitions of steps (c) and (d) ranges from one to three.

3. The method of claim 1 wherein said low molecular weight alcohol consists essentially of an alcohol selected from the group consisting of methanol, ethanol, n-propanol, iso-propanol, allyl alcohol, and propargyl alcohol.

4. The method of claim 3 wherein said low molecular weight alcohol consists essentially of an alcohol selected from the group consisting of n-propanol and iso-propanol.

5. The method of claim 4 wherein said low molecular weight alcohol consists essentially of n-propanol.

6. The method of claim 1 wherein said biocide is present in an amount of at least about 0.1 wt. %.

7. A method for accelerating and enhancing wetting of hydrophobic foams serving as storage reservoirs for ink for application to ink-jet pens, comprising the steps of:

(a) compressing said hydrophobic foam to expel air from the foam, thereby forming compressed foam;

(b) immersing said foam in a room-temperature prewet bath in an open vessel containing a solution comprising at least one low molecular weight alcohol selected from the group consisting of methanol, ethanol, n-propanol, and iso-propanol and ranging in concentration from about 3 to 10 wt. %, 0 to about 0.5 wt. % of a biocide, and the balance water;

(c) allowing said compressed foam to expand in said prewet bath and to thereby absorb said solution;

(d) compressing said foam while said foam remains immersed in said prewet bath;

(e) repeating steps (c) and (d) from one to three times;

(f) removing said foam from said prewet bath; and (g) compressing said foam, thereby expelling excess solution while leaving a residual amount of said alcohol within the foam and forming wetted foam.

8. The method of claim 7 wherein said foam is compressed between rollers.

9. The method of claim 7 wherein said foam is compressed between plates.

10. The method of claim 7 wherein said foam remains immersed in said prewet bath for steps (b) through (e) for a time period ranging from 5 to 10 seconds.

11. The method of claim 7 wherein said low molecular weight alcohol consists essentially of an alcohol selected from the group consisting of n-propanol and iso-propanol.

12. The method of claim 11 wherein said low molecular weight alcohol consists essentially of n-propanol.

13. The method of claim 7 wherein said low molecular weight alcohol is present in the solution constituting said prewet bath at about 5 wt. %.

14. The method of claim 13 wherein said wetted foam is fashioned into an ink reservoir, comprising the steps of:

(a) placing said wetted foam within an ink-jet pen body; and (b) injecting said wetted foam with ink.

15. The method of claim 14 wherein said low molecular weight alcohol constitutes less than 10% of said ink as a residual.

16. A method for accelerating and enhancing wetting of hydrophobic foams serving as storage reservoirs for ink for application to ink-jet pens, comprising the steps of:

(a) compressing said hydrophobic foam to about one-fifth of its uncompressed volume, thereby expelling air from the foam and forming compressed foam;

(b) immersing said foam in a room-temperature prewet bath in an open vessel containing a solution comprising n-propanol at a concentration of about 5 wt. %, a biocide at a concentration of about 0.3 wt. %, and the balance water;

(c) allowing said compressed foam to expand in said prewet bath and to thereby absorb said solution;

(d) compressing said foam to about one-fifth of its uncompressed volume while said foam remains immersed in said prewet bath;

(e) repeating steps (c) and (d) twice, (f) removing said foam from said prewet bath; and (g) compressing said foam to less than one-half of its uncompressed volume, thereby expelling excess solution while leaving a residual amount of said alcohol within the foam and forming wetted foam.

17. The method of claim 16 wherein said foam remains immersed in said prewet bath for steps (b) through (e) for a time period of about 7 seconds.

18. The method of claim 16 wherein said wetted foam is fashioned into an ink reservoir, comprising the steps of:

(a) placing said wetted foam within an ink-jet pen body; and (b) injecting said wetted foam with ink.

19. The method of claim 18 wherein said ink contains residual low molecular weight alcohol at about 5 wt. %.

* * * * *